INVENTOR.
CECIL R. JONES

INVENTOR.
CECIL R. JONES

BY

ATTORNEY

3,785,925
PORTABLE RADIATION SHIELD FOR NUCLEAR REACTOR INSTALLATION
Cecil R. Jones, Milford, Conn., assignor to Transfer Systems Incorporated, New Haven, Conn.
Filed Nov. 1, 1971, Ser. No. 194,665
Int. Cl. G21c 11/00
U.S. Cl. 176—87                                                                    13 Claims

ABSTRACT OF THE DISCLOSURE

A portable radiation shield for a nuclear reactor is described. The shield is positioned between the reactor vessel and the fuel pool canal during fuel transfer therebetween. It features dual sets of lifting lugs, and flared rails and a removable plate to guide the fuel to a safer location in case of an accidental fall.

---

This invention relates to a portable radiation shield for bridging the dry well between a nuclear reactor vessel and a fuel storage pool.

In a number of BWR plants there exists the possibility of producing excessive radiation levels in large areas of the dry well during transfer of irradiated fuel from the reactor vessel to the spent fuel pool. Currently insufficient shielding is provided for irradiated fuel when the fuel is in the transfer area between the vessel and canal to the spent fuel pool. As a result personnel occupancy in areas of the dry well have to be prohibited during fuel transfer. Such a limitation on dry well occupancy could stretch out considerably the performance of maintenance on equipment in the dry well and almost certainly extend the total outage time.

The chief object of the invention is to avoid the foregoing problems.

In accordance with my invention, I provide a portable radiation shield which is placed between the vessel flange and the canal sill so as to bridge the underlying dry well. The transferred fuel is passed over the radiation shield reducing radiation levels in the dry well, well below the danger level. A feature of the invention is a lifting frame for the shield incorporating provision for preventing an accidental drop of the shield during its installation or removal. Another feature is provision of safety rails on the lifting frame to help guide the transferred fuel over the shield. Still a further feature is the provision of a removable plate to bridge the space between the reactor core barrel and the vessel wall to prevent wedging of the fuel in said space in case of an accidental drop and thus dangerous irradiation of personnel in the dry well.

For a clearer understanding of the invention, there will now be described in detail an exemplary embodiment of the invention, reference being had to the accompanying drawing wherein.

Figure 1:
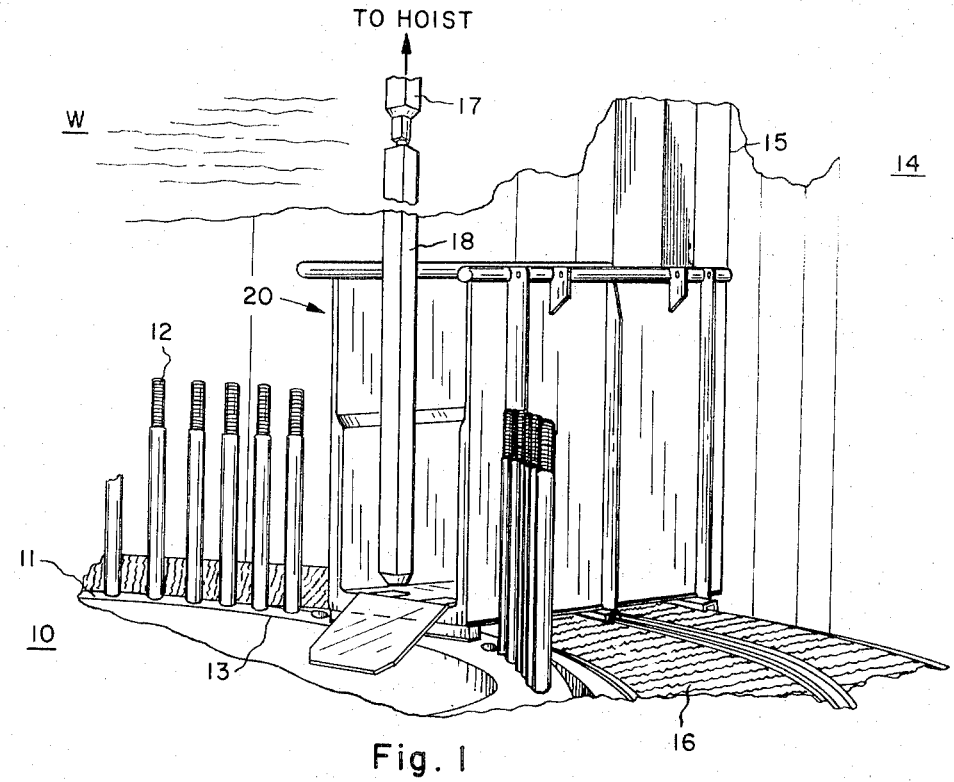
FIG. 1 is a perspective view showing one form of the shield of my invention in place bridging the dry well between the reactor vessel and the fuel pool.

FIG. 1 illustrates the radiation shield in place in the reactor well of a typical BWR. The reactor vessel is shown at 10 with the head removed, which is normally mounted on the vessel flange 11 by means of a series of bolts 12. Several of the bolts have been removed to allow passage of the fuel. Located within the reactor vessel but not shown in FIG. 1 is a drier, below that a steam separator, and below that the fuel core which is enclosed in a fuel barrel spaced from the inside of the vessel wall 13. Situated next to the vessel is the fuel storage pool 14 which is connected to the reactor well by means of a canal 15 usually closed off by doors, which are not shown.

The vessel flange 11 is water-tight sealed to the fuel pool wall by means of a sealing structure 16 in order to maintain the regions below dry and free of water. This dry well contains reactor equipment which usually undergoes maintenance at the time the reactor is shut down for re-fuelling.

In the refuelling process, the vessel head is removed, the drier is removed, several bolts are removed for passage of the fuel, then the area is flooded with water, the canal door opened, the steam separator removed rendering accessible the fuel assemblies, and then a fuel grapple 17 is lowered, connected to a fuel assembly 18, which is lifted up to clear the vessel flange, and then passed over the dry well through the fuel pool canal 15 and placed in a storage rack located therein. Then fresh fuel may be removed from the storage rack and carried through the canal and placed in the core. In this process, irradiated fuel passes over the dry well. The water present and seal structure is insufficient protection for personnel working in the dry well. Hence occupancy of the dry well must be prohibited.

Figure 3:
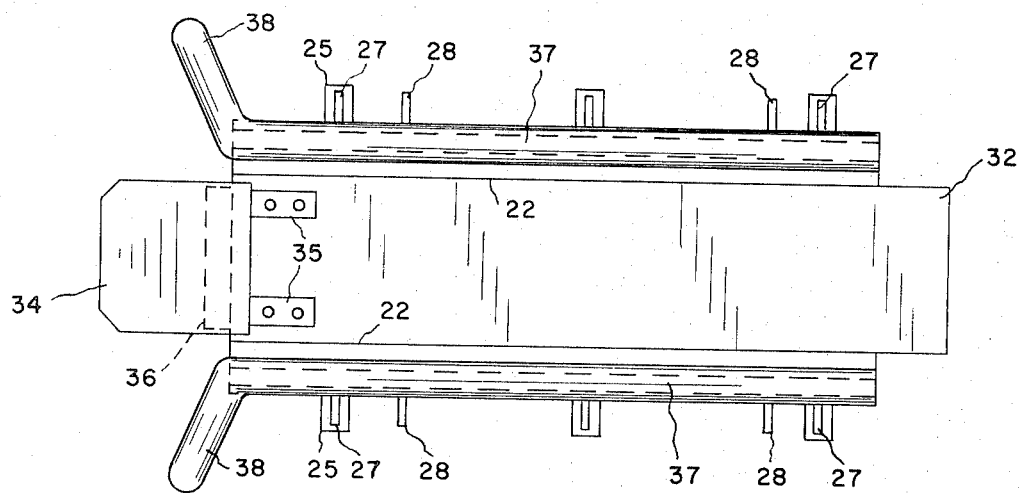
FIG. 3 is a top view of the shield of FIG. 2.
Figure 2:
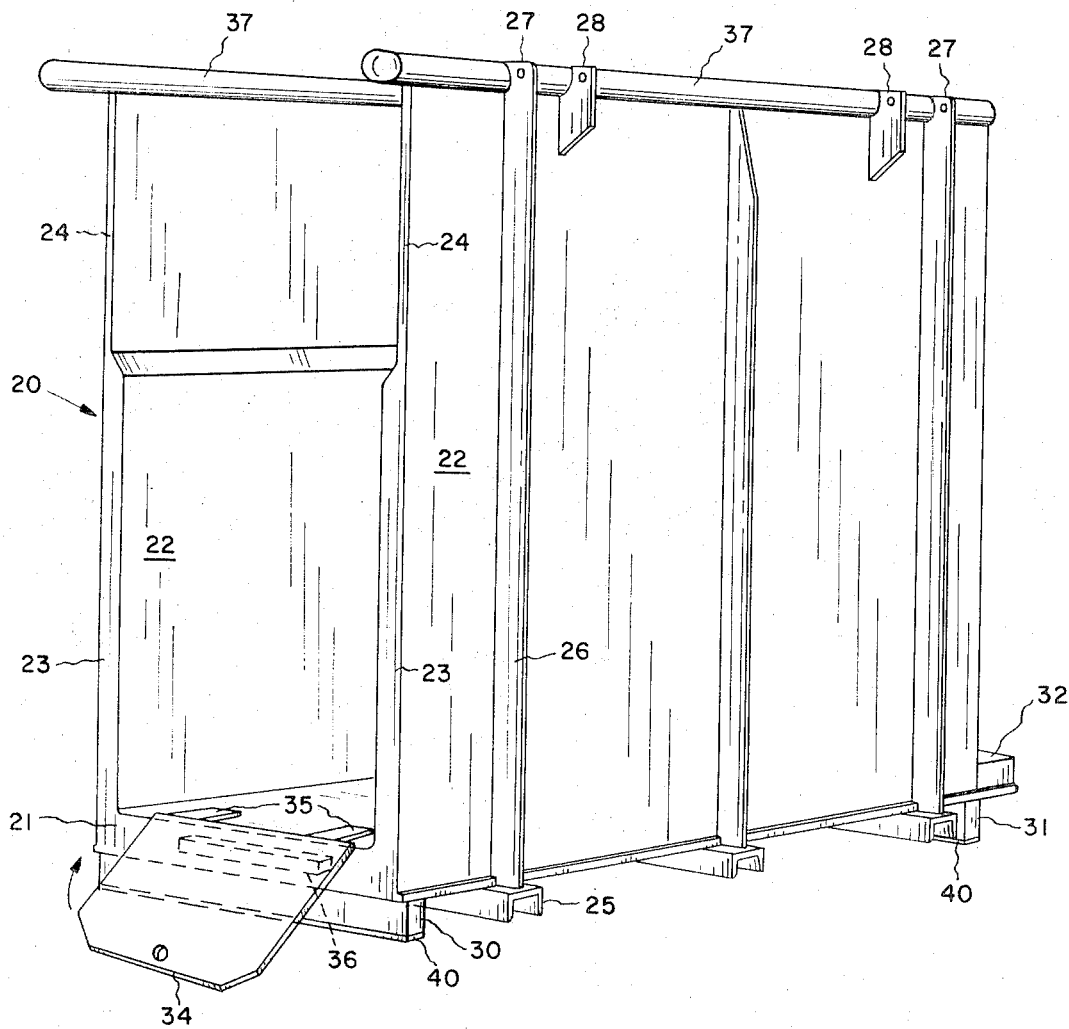
FIG. 2 is a perspective view of the inventive shield of FIG. 1 standing alone.

In accordance with the invention, a portable radiation shield 20 is provided over the dry well to eliminate the introduction therein of excessive radiation levels, and thus permits continuous personnel occupancy of the drywell under normal refuelling conditions. The shield 20, also shown in FIGS. 2 and 3, comprises a one-piece generally U-shaped channel member having a base member 21 and opposed side walls 22. The side walls 22 comprise a thicker lower portion 23 and thinner upper portion 24. The shield is constructed generally of welded stainless or carbon steel parts except that the thicker side wall portions 23 and base 21 are filled with lead to increase the radiation shielding. The structure is reinforced by three channels 25 extending along the base bottom and connected to vertical stiffening members 26 on opposite side walls and of which two terminate at the top in an eye-hole forming a lifting lug 27. Two additional lifting lugs 28 are located on the top of each side wall. At the reactor side of the shield 20 is located at the bottom a support member 30 which rests on the vessel flange. At the fuel pool side is located a second support member 31 which rests on the canal sill. On the same side the lead filled base extends beyond the side walls a short distance, as shown at 32. This construction ensures that, with the shield in place, the lead-filled base overlaps both the vessel flange and the concrete canal sill thus ensuring adequate shielding material will always be present between the transferred fuel and the dry well. Shims 40 of soft material such as aluminum are attached by bolts along the lower sides of support members 30, 31. These are used to adjust the difference in height between the vessel 11 and canal 15 to maintain the shield horizontal and to prevent damage to the vessel flange or its stainless steel liner.

Also located at the reactor side of the shield 20 is a fold-down plate 34 which is hinged 35 at the top surface of the base 21. The plate 34 is shown in its folded out position where it bears against a projecting stop 36 located at the reactor side of the shield. When not in use, the plate 34 may be folded back as shown by the arrow into the shield interior. Running along the top of the side walls in a pair of rails 37. The reactor side of the rails is flared outwardly as shown at 38.

In use, the lugs 28 act as the primary lifting lugs and lugs 27 as secondary lifting lugs. The overhead crane for lowering the shield in place is connected by two sets of support cables to these two sets of lugs providing a dual sling arrangement utilizing two hooks thus providing double lifting support for the shield during its installation and removal. This protects against an accidental drop in case one set of support cables fail. When the shield 20 is in place, and after the drier and separator have been removed, the fold down plate 34 is folded out as shown. It occupies a position which overlaps the space between the core barrel and vessel wall. Thus, should a fuel assembly accidentally fall at the entrance to the shield, it will be deflected away from the aforementioned space into the core. If it lodged in that space, insufficient shielding for its radiation into the dry well may be present. The folding plate is necessary to avoid interference with removal of the drier and separator. The flared rails ends 38 help guide the fuel assembly into the entrance to the shield, limit movement of the fuel assembly beyond the inside diameter of the vessel flange, and in case of an accidental drop of the fuel as it approaches the shield causes the fuel to fall into the protective shield rather than over the dry well seal.

After transfer of the fuel has been completed, the plate 34 is folded out of the way, the separator reinstalled in the reactor vessel, the fuel pool doors closed, the water over the dry well pumped or drained out, and finally, the removed bolts and drier reinstalled, the shield lifted out of the reactor well, and the vessel head bolted back into position.

The embodiment illustrated employed a folding plate extending from the shield for deflecting falling fuel from lodging in the space between the core barrel and vessel wall. Other constructions providing a member which in one position can be extended over the space between core barrel and vessel and which can be removed to a second position allowing sufficient access to the reactor vessel for removal of interior equipment, are also within the contemplation of this invention. For example, the deflection plate can be slidable along the floor of the base 21 from a first position where it projects beyond the shield the required distance to a second position within the shield. In this case, the plate would remain horizontal and would not be angled downward as illustrated in the drawing.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A portable radiation shield for use in a nuclear reactor plant, comprising a generally U-shaped member formed by a base and two upstanding side walls of radiation shielding material and elongated in a direction transverse to the plane of the U and defining an open top and open ends to allow the passage of radioactive articles through and cross said member, means on said member for lifting same, first means at one end for supporting the shield on the reactor vessel flange, and second means at the other end for supporting the shield on the fuel pool sill.

2. A portable radiation shield as set forth in claim 1 and further including a movable member mounted on the base adjacent one open end and selectively movable between a first extended position relative to the member and a second retracted position.

3. A portable radiation shield as set forth in claim 1 and further including means extending along the top of the side walls and flaring outwardly from an open end of the shield member.

4. A portable radiation shield as set forth in claim 1 wherein the side walls comprise a lower portion of greater radiation absorption and an upper portion of smaller radiation absorption.

5. A portable radiation shield as set forth in claim 4 wherein two sets of lifting lugs are provided on each side wall.

6. A portable radiation shield as set forth in claim 1 wherein the base extends beyond the second supporting means.

7. A portable radiation shield as set forth in claim 1 wherein shims of soft material are mounted on the bottom of the first and second supporting means.

8. In a nuclear reactor plant having a reactor vessel separated from a fuel storage pool by a dry well, a portable radiation shield for bridging the dry well during transfer of radioactive fuel between the vessel and the pool, means for lifting the shield, said shield having a length enabling it to bridge the dry well when positioned thereover, and safety means mounted on the shield for guiding the radioactive fuel to a safer location away from the unshielded dry well in case of accidental fall of the fuel during transport to or across the shield.

9. The invention of claim 8 wherein the shield comprises a generally U-shaped member having a base and upstanding side walls forming a structure elongated in a direction transverse to the plane of the U and having an open top and open ends.

10. The invention of claim 9, and further including means for guiding the transferred fuel into an open end of the shield member.

11. The invention of claim 10 wherein said guiding means comprises outwardly flared rails extending along the top of the side walls.

12. The invention of claim 9 and further including means for deflecting dropping fuel away from the space between the reactor vessel and a core within the vessel, said deflecting means comprising a member extending outwardly from the base and over the said space, and means for retracting the deflecting member to the shield.

13. The invention of claim 8 and further including first means on the shield for supporting same on the vessel flange, and second means on the shield for supporting same on the fuel pool sill.

References Cited

UNITED STATES PATENTS

| 3,483,380 | 12/1969 | Antonsen et al. | 250—108 R |
| 3,051,642 | 8/1962 | Dent | 176—30 |
| 3,137,397 | 6/1964 | Nicoll et al. | 176—30 |
| 3,436,544 | 4/1969 | Graf Jr. | 250—108 WS |

REUBEN EPSTEIN, Primary Examiner

U.C. Cl. X.R.

250—108 R; 176—30

PO-1050
(5/69)

UNITED STATES PATENT OFFICE
CERTIFICATE OF CORRECTION

Patent No. 3,785,925          Dated January 15, 1974

Inventor(s) CECIL R. JONES

It is certified that error appears in the above-identified patent and that said Letters Patent are hereby corrected as shown below:

Column 3, line 57, "cross" should read -- across --.

Signed and sealed this 15th day of July 1975.

(SEAL)
Attest:

RUTH C. MASON
Attesting Officer

C. MARSHALL DANN
Commissioner of Patents
and Trademarks